(12) United States Patent
Aziz

(10) Patent No.: US 7,684,504 B2
(45) Date of Patent: Mar. 23, 2010

(54) SYSTEM AND METHOD FOR REDUCING EDGE EFFECT

(75) Inventor: Ahsan U. Aziz, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 712 days.

(21) Appl. No.: 11/589,877

(22) Filed: Oct. 31, 2006

(65) Prior Publication Data

US 2008/0101483 A1 May 1, 2008

(51) Int. Cl.
*H04K 1/10* (2006.01)
(52) U.S. Cl. ...................................... 375/260; 375/267
(58) Field of Classification Search ................ 375/260, 375/267; 370/210, 343, 480, 481, 491
See application file for complete search history.

(56) References Cited

U.S. PATENT DOCUMENTS

| 6,754,170 | B1 | 6/2004 | Ward | |
|---|---|---|---|---|
| 7,340,000 | B1* | 3/2008 | Hart et al. | 375/260 |
| 7,529,310 | B2* | 5/2009 | Auer | 375/267 |
| 2003/0016773 | A1 | 1/2003 | Atungsiri et al. | |
| 2003/0108127 | A1* | 6/2003 | Eilts et al. | 375/340 |
| 2003/0123383 | A1 | 7/2003 | Korobkov et al. | |
| 2003/0133473 | A1* | 7/2003 | Manis et al. | 370/480 |
| 2003/0223354 | A1* | 12/2003 | Olszewski | 370/208 |
| 2005/0147025 | A1* | 7/2005 | Auer | 370/203 |
| 2005/0286465 | A1 | 12/2005 | Zhuang | |
| 2006/0245349 | A1* | 11/2006 | Vrcelj et al. | 370/210 |
| 2008/0080628 | A1* | 4/2008 | To et al. | 375/260 |

FOREIGN PATENT DOCUMENTS

WO    2005081481 A1    9/2005

OTHER PUBLICATIONS

International Search Report and Written Opinion related to PCT/USO7/77172, Applicant's file reference WM10083TS, dated Mar. 19, 2008.
Macleod, M.D. Fast interpolation by FFT with greatly increased accuracy; *Electronics Letters*, Jun. 24, 1993; vol. 29, No. 13.
Antipolis, Sophia, EUTRA Downlink numerology and design, Jun. 20-21, 2005.

* cited by examiner

*Primary Examiner*—Emmanuel Bayard

(57) ABSTRACT

A channel estimator (150) is provided that comprises: an extension circuit (410) configured to receive a pilot signal (510), and add front and back extension signals (620, 630) to a front and back of the pilot signal, respectively, creating a first signal (610), the front and back extension signals being extension of a first and last symbol, respectively, in the pilot signal; an IDFT circuit (420) configured to perform an IDFT function on the first signal, generating a second signal (710); a signal processing element (430, 440, 470, 480) configured to perform one or more operations on the second signal, generating a third signal (910); a DFT circuit (450) configured to perform a DFT function on the third signal, generating a fourth signal (1010); and a reduction circuit configured to cut off front and back ends of the fourth signal, generating a channel estimation signal (1110).

20 Claims, 7 Drawing Sheets

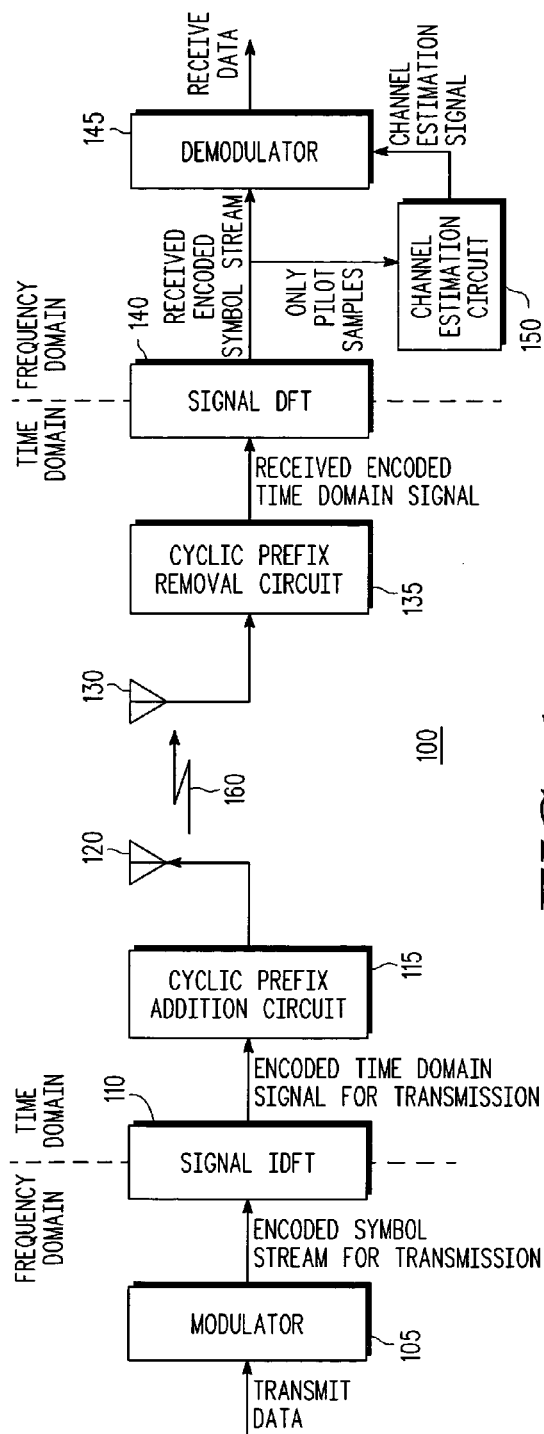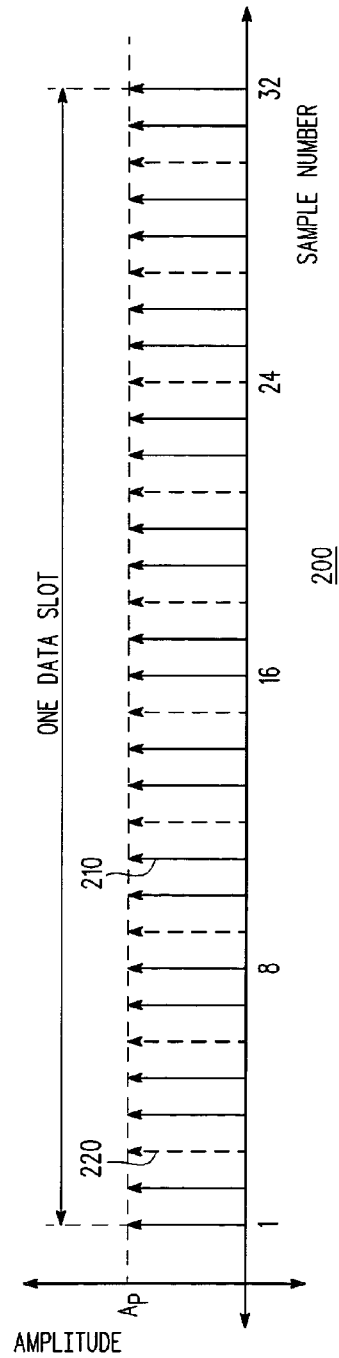
FIG. 1
FIG. 2

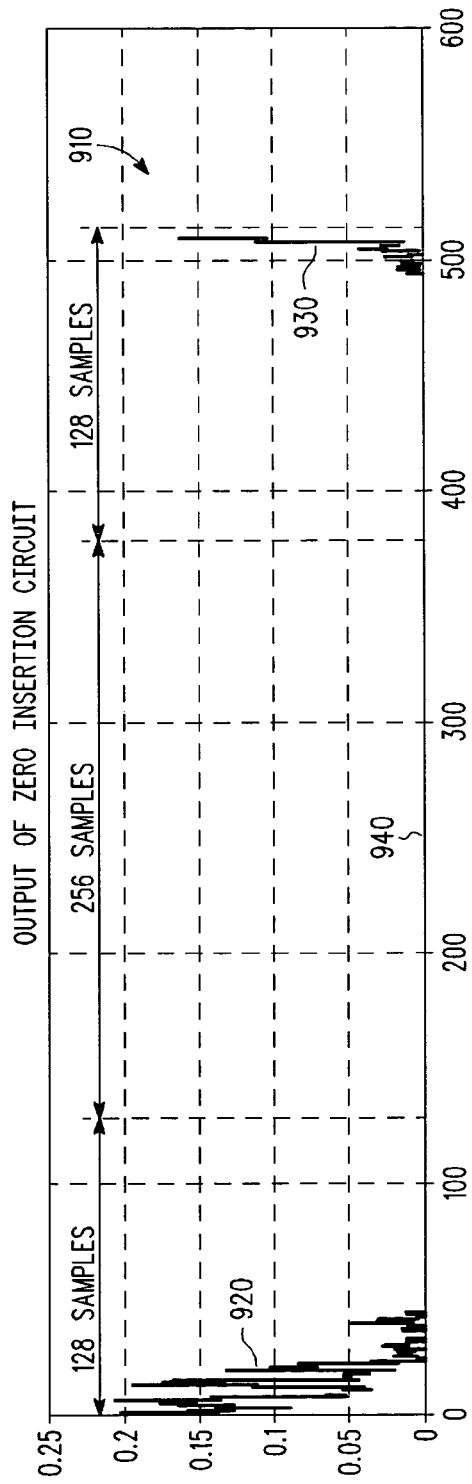
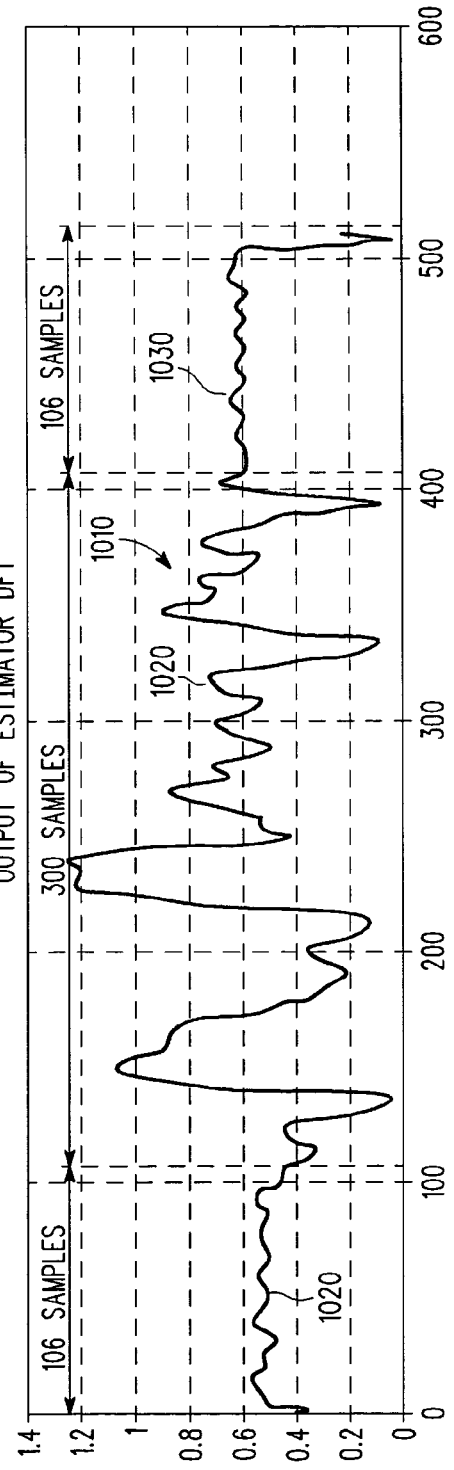

SYSTEM AND METHOD FOR REDUCING EDGE EFFECT

FIELD OF THE INVENTION

The present invention relates in general to a system and method to improve channel estimation in an orthogonal frequency division multiplexed (OFDM) transmission system. In particular it relates to a system and method for reducing the edge effect of OFDM signals.

BACKGROUND OF THE INVENTION

In an orthogonal frequency division multiplexed (OFDM) transmission system an available frequency band is divided into multiple smaller frequency bands. Multiple signals are then modulated and simultaneously transmitted on these multiple frequency bands.

Possible modulation schemes used with OFDM include binary phase shift keying (BPSK), in which one bit is encoded to each symbol, quadrature phase shift keying (QPSK), in which two bits are encoded to each symbol, or even a quadrature amplitude modulation (QAM) scheme in which multiple bits are encoded to each symbol.

In order to simplify the design of transceivers, symbol modulation in an OFDM device is often performed in the frequency domain. Then, prior to transmission, an inverse discrete Fourier transform (IDFT) is performed on the signal to move it into the time domain, where it can be transmitted as appropriate radio frequency (RF) signals. Likewise, when a transceiver receives signals in the time domain, it performs a discrete Fourier transform (DFT) on the signals to move the signal back into the frequency domain for symbol demodulation and data extraction.

Ideally, the signal received by a receiver device will be the same in amplitude as the signal transmitted by a transmitter device. However, in any kind of fading channel, such as a wireless transmission channel, the amplitude of a received signal will vary based on the particular properties of the channel. For example, signal interference can reduce the power of a received signal, while multipath reflections can increase the power of the received signal.

In many OFDM systems, therefore, the receiver will perform a channel estimation process to determine the effect that the channel has on a received signal. Based on this channel estimation, the receiver can then determine how to compensate the received signal for channel fading in order to retrieve the proper shape of the originally-transmitted signal.

One way this can be accomplished is if the receiver knows the proper shape of at least part of the received signal ahead of time. Unfortunately, transmitted data is typically unpredictable, so it can't be used for this purpose. However, one solution is to embed a known symbol pattern into the transmitted signal in place of some data. By examining the effect of the channel on the known portion of the signal, the receiver can estimate the effect of the channel on the entire signal, allowing it to determine how to compensate for the channel effect.

Some channel estimation circuits can include DFTs and IDFTs. But the circuit design for many DFTs and IDFTs can be comparatively complicated and expensive, making the design of the channel estimation circuit containing such a DFT or IDFT likewise complicated and expensive. One type of DFT and IDFT that is relatively simple, however, is a fast Fourier transform (FFT) and inverse fast Fourier transform (IFFT) used for powers of two. The expense and complication of the DFT and IDFT circuits can be limited by using FFT and IFFT circuits for powers of two.

But requiring the use of an FFT or IFFT either limits the choice of a known signal portion to signal portions whose lengths are powers of two, which may unduly limit their design, or requires that signal samples be passed through an FFT and IFFT despite the fact that they do not have the proper number of samples. Also in general, performing FFT/IFFT on blocks of data causes "edge effect" also known as "Gibbs phenomenon" this can cause significant disruption of the accuracy of the channel estimation.

It would therefore be desirable to provide a channel estimation system that would use FFT and IFFT circuits whenever possible, would allow any length of known signal portion to be used for channel estimation, but would also reduce any edge effect resulting from such channel estimation.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 1 is a block diagram of an OFDM transmission system, according disclosed embodiments;

FIG. 2 is a graph of the encoded symbol stream for transmission of FIG. 1, according to disclosed embodiments;

FIG. 9 is as graph of an output signal from the zero insertion circuit of FIG. 4, according to disclosed embodiments;

FIG. 10 is as graph of the output signal from the estimator discrete Fourier transform circuit of FIG. 4, according to disclosed embodiments;

DETAILED DESCRIPTION

Figure 3:
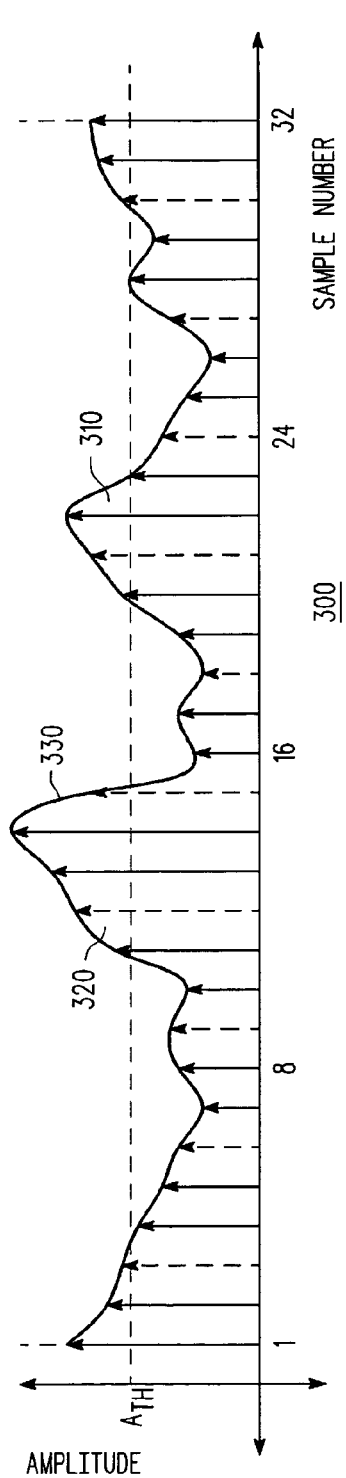
FIG. 3 is a graph of the received encoded symbol stream of FIG. 1, according to disclosed embodiments.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs), and in particular through the use of circuits involving CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

OFDM System

An orthogonal frequency division multiplexing (OFDM) system employing a channel estimation circuit is provided that allows for any size known signal portion. In this system, data is sent across a transmission medium in signals that are divided into data slots, each data slot containing a set number of bits of data.

FIG. 1 is a block diagram of an OFDM system, according to disclosed embodiments. As shown in FIG. 1, the OFDM system 100 includes a modulator 105, a signal inverse discrete Fourier transform (IDFT) circuit 110, a cyclic prefix addition circuit 115, a transmitter antenna 120, a receiver antenna 130, a cyclic prefix removal circuit 135, a signal discrete Fourier transform (DFT) circuit 140, a demodulator 145, and a channel estimation circuit 150. The modulator 105, signal IDFT circuit 110, cyclic prefix addition circuit 115, and transmitter antenna 120 form a transmitter within the OFDM system 100; and the receiver antenna 130, cyclic prefix removal circuit 135, signal DFT circuit 140, demodulator 145, and channel estimation circuit 150 form a receiver within the OFDM system 100.

The modulator 105 receives a set of transmit data, including multiple data bits, and encodes those data bits into a plurality of symbols that are placed in an encoded symbol stream for transmission. In addition to data symbols, however, the encoded symbol stream for transmission will also include a plurality of pilot symbols whose value and position are known to both the transmitter and the receiver.

FIG. 2 is a graph of the encoded symbol stream for transmission of FIG. 1, according to disclosed embodiments. As shown in FIG. 2, the encoded symbol stream for transmission for a given data slot 200 includes a series of symbols made up of data symbols 210 and pilot symbols 220.

The data symbols 210 are symbols that encode the data that is to be sent to a receiving device. These data symbols 210 could be modulated according to a variety of modulation schemes (e.g., BPSK QPSK, M-QAM, etc.) so the number of data bits encoded in each data symbol 210 could vary according to the embodiment.

The pilot symbols 220 represent a known signal pattern. In a given system 100, both a transmitter and receiver will know the values and placement of the pilot symbols 220 in a given data slot 200. This allows the receiver to know beforehand what at least a portion of the transmitted data slot 200 should have looked like at transmission.

The particular embodiment disclosed in FIG. 2 shows a data slot 200 having 32 symbols, with two out of every three symbols being a data symbol 210, and every third symbol being a pilot symbol 220. Thus, in this embodiment every data slot has 22 data symbols and 10 pilot symbols. However, the size of the data slot 200 and the position and frequency of the pilot symbols 220 can change according to individual embodiments.

Typically, the decision regarding the percentage of the data slot to devote to pilot symbols involves a tradeoff between channel estimation and data rate. The minimum number of pilots used needs to at least satisfy Nyquist sampling rate in order to reconstruct the channel for the pilots.

In addition, to ensure that the pilot symbol portion of the data slot 200 will provide an adequate estimation of the entire channel, it is necessary for the frequency of the pilot symbols 220 to meet the Nyquist sampling rate with respect to the channel coherence bandwidth. In particular, the frequency of the pilot symbols 220 must be at least half the channel coherence bandwidth. For example, if the coherence time of a channel is 5 µs, the coherence bandwidth is the inverse of the coherence time, i.e., $$\frac{1}{5\,\mu s} = 0.2\text{ MHz}.$$

The sampling rate of this channel thus needs to be at least half of the coherence bandwidth, (i.e., $$\frac{0.2\text{ MHz}}{2} = 0.1\text{ MHz}),$$

to meet the requirement of a Nyquist sampling rate. In an embodiment in which the subcarrier spacing was 15 KHz, this would mean that at least every sixth carrier would need to be a pilot (i.e., $$\frac{0.1\text{ MHz}}{15\text{ KHz}} = 6.66,$$

rounded down to 6)

As shown in FIG. 2, each of the data symbols 210 and pilot symbols 220 have a known pulse amplitude $A_P$. In the embodiment of FIG. 2 they are all at the same fixed amplitude. However, in alternate embodiments a variable amplitude could be used.

In the embodiment of FIG. 2, the pilot symbols 220 are evenly distributed throughout the data slot, i.e., they are provided as every third symbol. Having an even distribution allows for a more accurate channel estimation because the pilot symbols follow almost exactly the same distribution as the data symbols. However, in alternate embodiments the distribution need not be exactly even. The pilot symbols may be distributed in any desired pattern throughout the data slot 200. For example, in one embodiment some pilots are fixed in location (i.e., at a fixed time during a data slot), while others vary in location (i.e., are spread out over the data slot), creating unequally spaced pilots. In such an embodiment the equally spaced pilots are typically used for channel estimation while the fixed pilots are used for estimation of frequency/timing/doppler etc.

In the embodiment of FIG. 2, because the total number of symbols in one data slot 200 is a power of two, the system 100 can implement the signal IDFT circuit 110 as an inverse fast Fourier transform (IFFT) circuit, and can implement the signal DFT 140 circuit as a fast Fourier transform (FFT) circuit. In alternate embodiments, however, the total of samples in one data slot may be a value other than a power of two. However, when the slot size is not a power of two, the signal IFFT 110 and signal FFT 140 would have to be implemented with another kind of discrete Fourier transform circuit and inverse discrete Fourier transform circuit pair.

The signal IDFT circuit 110 performs an inverse discrete Fourier transform operation on the encoded symbol stream for transmission, converting it from the frequency domain to the time domain, to generate an encoded time domain signal for transmission. Although an IDFT circuit 110 is shown generally in the system of FIG. 1, in any embodiment in which a data slot contains a total number of symbols that is a power of two, the IDFT circuit 110 can be implemented as an inverse fast Fourier transform (IFFT), which is generally easier and cheaper to implement than other kinds of IDFT circuits.

The cyclic prefix addition circuit 115 adds a cyclic prefix to the beginning of each data slot, thereby extending the effective length of that data slot. The cyclic prefix extends the length of the data slot and allows the multipath portions of the received signal to settle before the next data slot is transmitted. This cyclic prefix is typically a repeated portion from the end of the data slot.

The length of the cyclic prefix is selected depending upon the delay spread of the multipath channel for the target application. It should preferably be at least as long as the channel delay spread or close to it in order to prevent inter symbol interference (ISI). The length of the cyclic prefix is sometimes called a guard interval.

After the cyclic prefix is added, the transmitter antenna 120 then transmits the encoded time domain signal, with cyclic prefix, as a transmitted signal 160 across a fading medium. The receiver antenna 130 in turn receives the transmitted signal 160, generally as a plurality of multipath versions, each separated in phase, and provides it to the remainder of the receiver.

The cyclic prefix removal circuit 135 operates on the received signal to remove the cyclic prefix and extract a received encoded time domain signal. Essentially, the cyclic prefix removal circuit 135 operates to extract the portion of the received signal that corresponds to the encoded time domain signal in the transmitter.

The signal DFT circuit 140 performs a discrete Fourier transform (DFT) on the received encoded time domain signal to convert it from the time domain into the frequency domain, to generate a received encoded symbol stream. As with the IDFT circuit 110, although a DFT circuit 140 is shown generally in the system of FIG. 1, in any embodiment in which a data slot contains a number of symbols that is a power of prime numbers, the DFT circuit 140 can be implemented as a fast Fourier transform (FFT), which is generally easier and cheaper to implement than other kinds of DFT.

FIG. 3 is a graph of the received encoded symbol stream of FIG. 1, according to disclosed embodiments. As shown in FIG. 3, the received encoded symbol stream in a received data slot 300 includes a series of samples made up of data samples 310 and pilot symbols 320. The pattern of the data symbols 310 and pilot symbols 320 in the received data slot 300 should be identical with a corresponding pattern of data symbols 210 and pilot symbols 220 in the transmitted data slot 200 (setting aside the issue of bit errors due in the received signal).

However, because of the fading nature of the transmission medium, the amplitude and phase of the data symbols 310 and pilot symbols 320 in the received data slot 300 will not be constant. In particular, the amplitude and phase of the data symbols 310 and pilot symbols 320 will form an amplitude profile similar to 330 that varies in magnitude.

In addition to performing a DFT function, the signal DFT circuit 140 is also capable of extracting the pilot symbols from the received encoded symbol stream, based on the receiver's foreknowledge of where in the data slot the pilot symbols will appear. This allows the extraction of the pilots symbols from the output of the signal DFT circuit 140.

The channel estimation circuit 150 then receives the pilot signal from the signal DFT circuit 140 and performs a channel estimation operation to generate a channel estimation signal. By comparing know data from an actual received data slot 300 (i.e., the pilot data 320) with known parameters of the transmission data slot 200 (i.e., with respect to the pilot data 200), the channel estimation circuit 150 can estimate qualities of the transmission channel.

The demodulator 145 then takes the received encoded symbol steam and the channel estimation signal and demodulates the received encoded symbol stream to extract a set of receive data that should be essentially the same as the transmit data provided to the modulator 105 (allowing for a certain amount of corrupted data during transmission due to noise, interference and small inaccuracy in various receiver blocks).

The demodulator 145 will then use the channel estimation signal from the channel estimation circuit 150 to adjust the received data constellation to remove the effect of the multipath fading channel. One way to do this is to multiply the encoded symbol stream by the inverse of the channel estimation signal.

Channel Estimation Circuit

Figure 4:
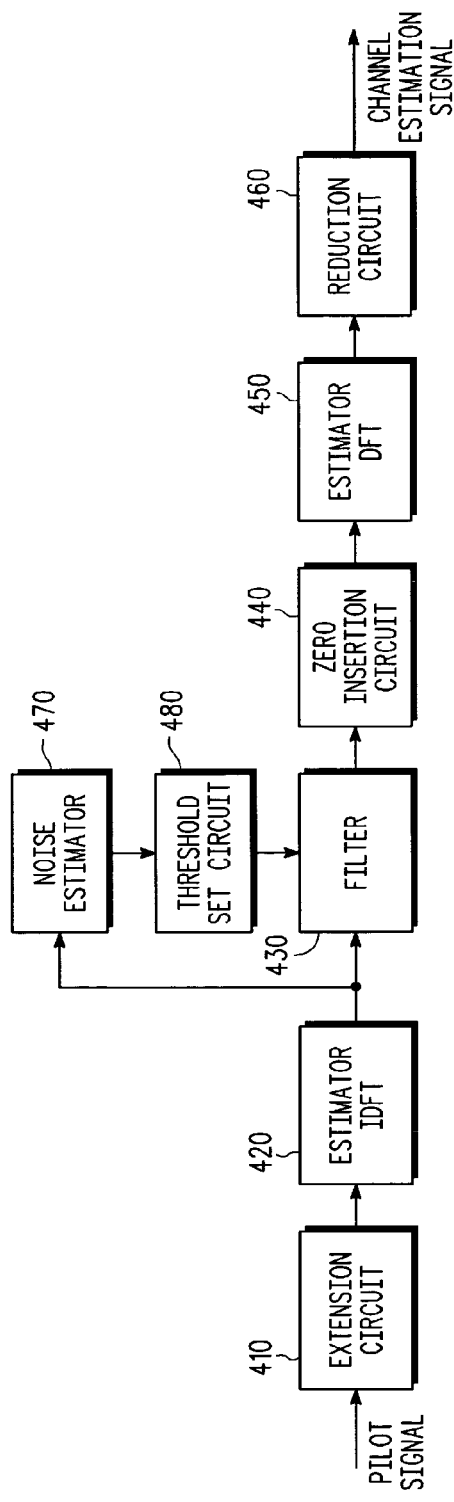
FIG. 4 is a block diagram of the channel estimation circuit of FIG. 1, according to disclosed embodiments.

As noted above with respect to FIG. 1, the channel estimation circuit 150 receives a pilot signal including information relating to the pilot samples in the received encoded symbol stream, and uses that information to generate a channel estimation signal. FIG. 4 is a block diagram of the channel estimation circuit of FIG. 1, according to disclosed embodiments. As shown in FIG. 4, the channel estimation circuit 150 includes an extension circuit 410, an estimator inverse discrete Fourier transform (IDFT) circuit 420, a filter 430, a zero insertion circuit 440, an estimator discrete Fourier transform (DFT) circuit 450, a reduction circuit 460, a noise estimator 470, and a threshold set circuit 480.

An exemplary operation of the channel estimation circuit 150 of FIG. 4 is shown by the graphs of FIGS. 5 to 10, which illustrate the signals at various points through the channel estimation circuit 150 for one embodiment. In the specific embodiment shown in FIGS. 5 to 10, 150 pilot symbols are provided in a data slot.

In operation, the extension circuit 410 receives the pilot signal from the signal DFT circuit 140 and extends the front and the back side of the pilot signal's envelope by a set amount to generate an extended frequency domain signal. This extension operation can be an extension that simply repeats the first and last values, or it can involve a more complicated extension based on some continuous function (i.e., a function that is differentiable over its entire duration).

In some embodiments, the extension can provide that the resulting extended frequency domain signal output from the extension circuit 410 have a number of samples that will allow the estimator IDFT 420 to be an IFFT.

Figure 5:
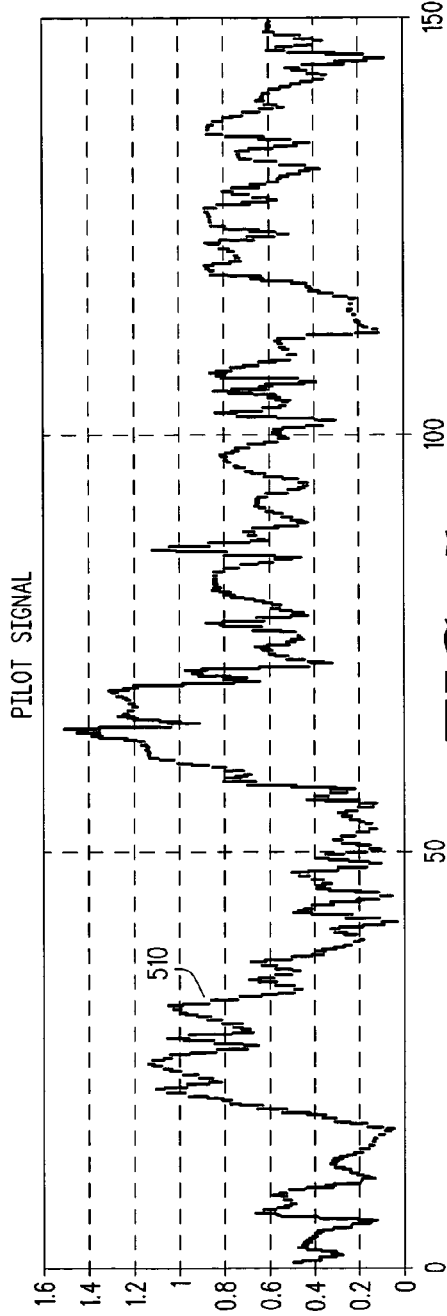
FIG. 5 is as graph of a pilot signal input signal to the extension circuit of FIG. 4, according to disclosed embodiments.

FIG. 5 is as graph of a pilot signal provided to the extension circuit of FIG. 4, according to disclosed embodiments. As shown in FIG. 5, the pilot signal 510 is a graph of the amplitudes of the pilot symbols for a given data slot, and provides a rough estimate of the channel properties by showing samples taken throughout the data slot.

Figure 6:
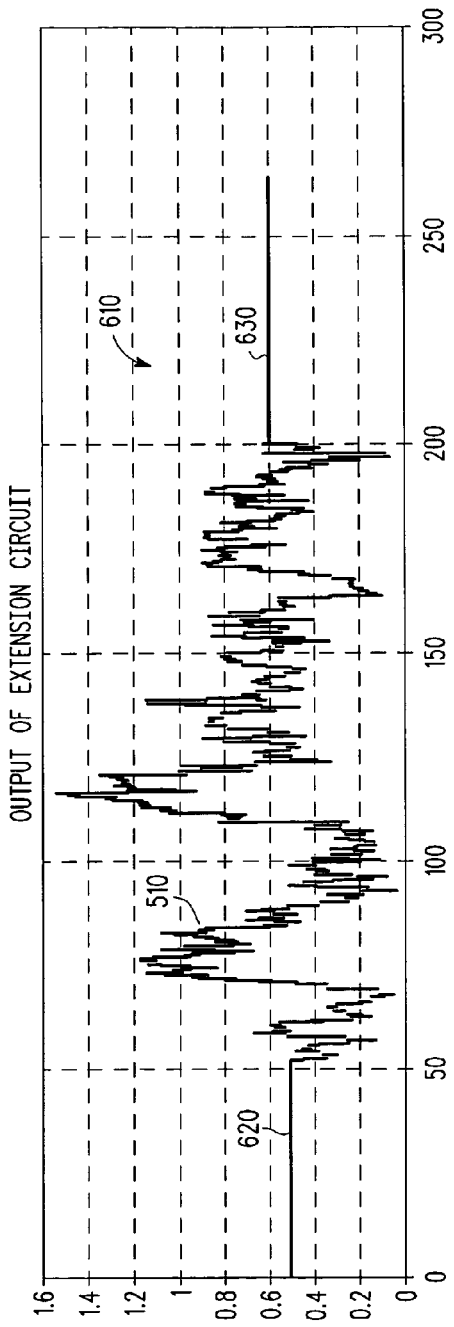
FIG. 6 is as graph of an output signal from the extension circuit of FIG. 4, according to disclosed embodiments.

FIG. 6 is as graph of an output signal from the extension circuit of FIG. 4, according to disclosed embodiments. As shown in FIG. 6, the extension circuit 410 adds a beginning extension signal 620 to the beginning of the pilot signal 510 and an ending extension signal 630 to the end of the pilot signal 510 to generate the extended frequency domain signal 610.

In this embodiment the beginning extension signal 620 and the ending extension signal 630 both have a length of 53 symbols, giving a total length for an extended frequency domain signal 610 of 256 symbols (i.e., a power of two). However, the lengths of the beginning extension signal 620 and the ending extension signal 630 could vary in alternate embodiments. The total length of the beginning extension signal 620 and the ending extension signal 630 can be chosen based on a number of criteria. However, if the lengths of the beginning extension signal 620 and the ending extension signal 630 are chosen such that the length of the resulting frequency domain extended signal 610 is a power of two, the estimator IDFT 420 can be implemented as a radix-2 inverse fast Fourier transform (IFFT), which can simplify the circuit design significantly compared to other IDFT designs. Alternate embodiments could employ other radix values, however.

In the particular embodiment of FIG. 6, the beginning extension signal 620 is a linear extension of the first value of the pilot signal 510, and the ending extension signal 630 is a linear extension of the last value of the pilot signal 510. By extending the pilot signal 510 at the beginning and end, the extension circuit 410 creates an extended signal that does not have any discontinuities close to the beginning and end of the pilot signal 510. In this particular embodiment the length of the beginning extension signal 620 and the ending extension signal 630 should be long enough that any effect from discontinuities at the beginning of the beginning extension signal 620 or at the end of the ending extension signal 630 will have settled before the portion corresponding to the pilot signal 510 is analyzed.

In alternate embodiments the beginning extension signal 620 and the ending extension signal 630 this can be changed from a flat linear extension to an alternate signal formula, e.g., a non-linear signal shape, i.e., continuous function (differentiable at all points). In general, any signal shape that avoids the presence of discontinuities along its length can be used. In one particular set of embodiments the shape of the beginning extension signal 620 and the ending extension signal 630 can be selected such that these two end points of these signal portions arrive at the same amplitude. This can avoid discontinuities at the edges as well as across the beginning extension signal 620 and the ending extension signal 630, by making sure that there is no discontinuity where a beginning extension signal 620 and an ending extension signal 630 meet.

The estimator IDFT 420 performs an IDFT operation on the extended frequency domain signal from the extension circuit 410 to convert it from the frequency domain into the time domain to generate the time domain signal. The estimator IDFT 420 should have a length equal to a length of the total frequency domain signal at the output of 410.

Figure 7:
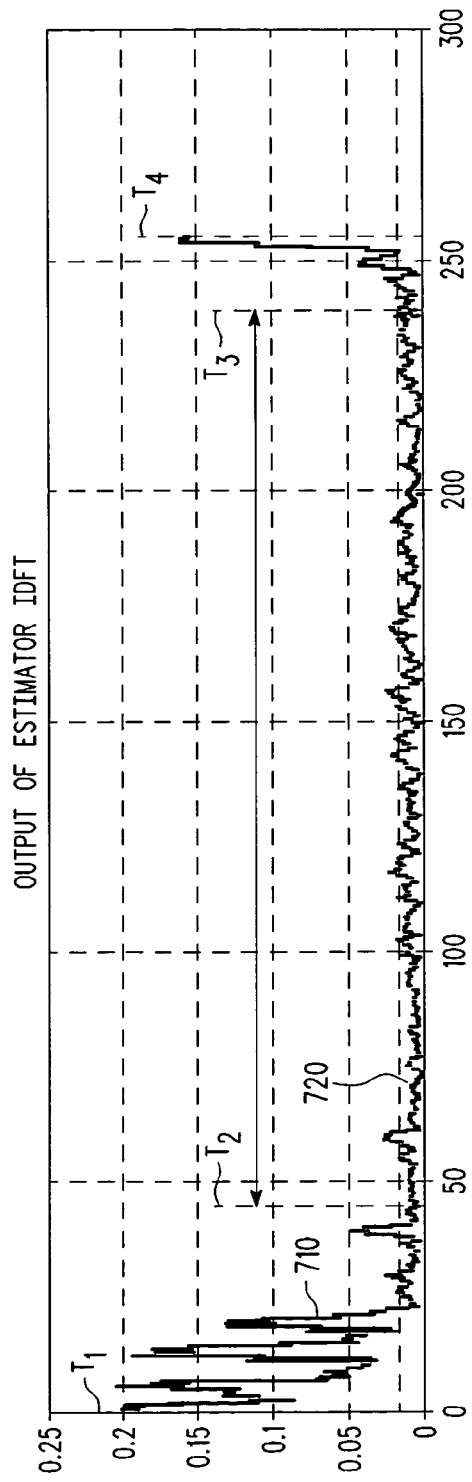
FIG. 7 is as graph of an output signal from the estimator IDFT circuit of FIG. 4, according to disclosed embodiments.

FIG. 7 is as graph of an output signal from the estimator IDFT circuit of FIG. 4, according to disclosed embodiments. As shown in FIG. 7, the signal output from the estimator IDFT 420 to the filter 430 is a time domain version of the extended frequency domain signal 610 output from the extension circuit 410 shown in FIG. 6 (i.e., it's an extended time domain signal 710). Because of the nature of an IDFT operation, the extended time domain signal 710 can be considered a "sampled" channel impulse response.

The location up to which dominant channel taps are present in the estimator IDFT 420 output can be referred to as $T_2$. This represents the dominant multipath of the time domain channel impulse response. Its length in time is equal to the OFDM cyclic prefix and is pre-determined based on the length of the cyclic prefix.

Since the extended time domain signal 710 is simply a converted version of the extended frequency domain signal from FIG. 6, the extended time domain signal 710 also has an effective length of 256 symbols.

The filter 430 performs a filtering operation on the extended time domain signal 710 output from the estimator IDFT 420 to produce a filtered signal based on a threshold set value provided by the threshold set circuit 480. In the disclosed embodiment this is a non-linear filtering process. Filtering will help improve the accuracy of the channel estimate by filtering out noise from the pilot signal. It is performed based on a noise threshold received from the threshold set circuit 480.

Figure 8:
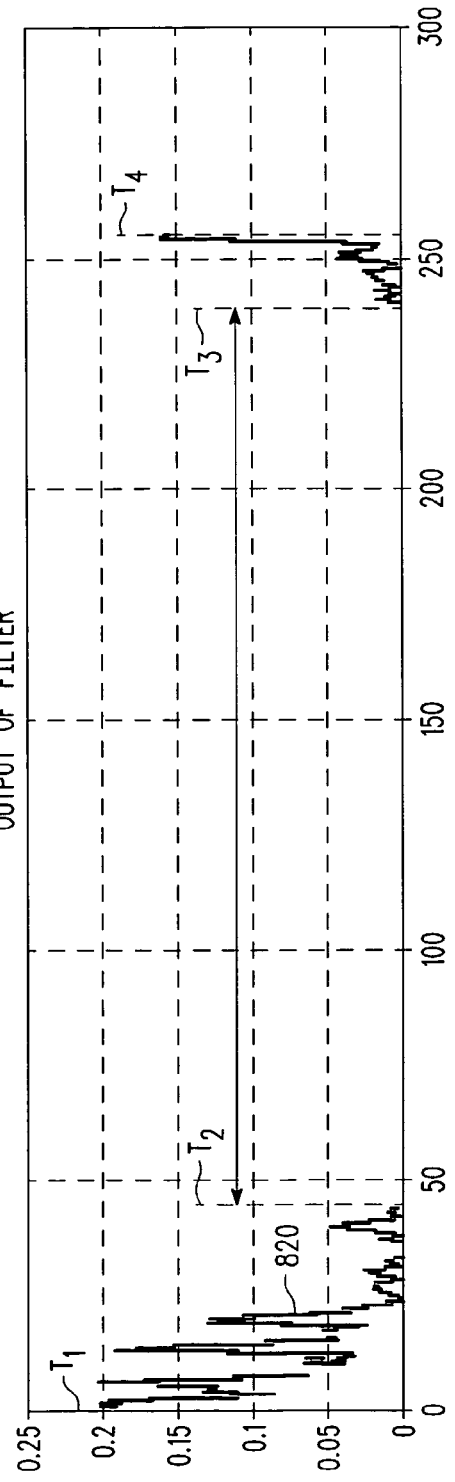
FIG. 8 is as graph of an output signal from the filter circuit of FIG. 4, according to disclosed embodiments.

FIG. 8 is as graph of an output signal from the filter circuit of FIG. 4, according to disclosed embodiments. As shown in FIG. 8, the signal output from the filter 430 to the zero insertion circuit 440 is a filtered version of the extended time domain signal 710 output from the estimator IDFT 420 shown in FIG. 7.

In operation, the noise estimator 470 receives the extended time domain signal 710 and uses it to provide an estimate of the amount of noise in pilot signal to the threshold set circuit 480. It performs this operation by first computing the noise level of the extended time domain signal 710 using the portion of the extended time domain signal 710 that is beyond the dominant taps of the estimator IDFT 420 (i.e., between times $T_2$ and $T_3$). In particular, in one embodiment the noise is estimated as a variance of the extended time domain signal 710 that is beyond the dominant taps. The fact that the noise-free extended time domain signal 710 has very low/zero values beyond the dominant taps allows this noise threshold calculation.

The threshold set circuit 480 then uses the estimated amount of noise provided by the noise estimator 470 to generate a noise threshold 720, which is provided to the filter 430. This noise threshold 720 represents an estimate of the noise variance of the received signal.

The filter 430 also receives the extended time domain signal 710 and uses the threshold value 720 to set all points in the extended time domain signal 710 below the threshold 720 to zero or some very low value in the region from the sample at time $T_1$ to the sample at time $T_2$, as well as in the region from the sample time $T_3$ to the sample time $T_4$. In alternate embodiments a multiple of the threshold 720 can be used for filtering, rather than the exact value. In addition, the filter 430 also sets all values in the extended time domain signal 710 that are between $T_2$ and $T_3$ to zero, regardless of whether they are above or below the threshold 720.

By "zeroing out" portions of the extended time domain signal 710, as described above, the filter 430 performs the "nonlinear" filtering operation and generates a filtered signal 810.

Additional linear filtering can be performed in other embodiments on the dominant taps to reduce their noise. For example, in some embodiments, the bandwidth of the additional filtering operation can be a function of the previously computed noise threshold 720.

The zero insertion circuit 440 receives the filtered signal 810 from the filter 430, splits it in half, and inserts a zeroed signal between the two halves (i.e., inserts a number of zero values between the two halves). This allows the ideal interpolation. The number of inserted zeros depends on the order of interpolation required. In an embodiment that uses 2× interpolation the number of inserted zeros equals the number of pilots. If 3× interpolation was required, then the number of zeros would be twice the number of pilots such that sum of pilots and zeros would equal three times the original number of pilots. Higher orders of interpolation are possible within the restrictions of the Nyquist sampling rate.

FIG. 9 is as graph of an output signal from the zero insertion circuit of FIG. 4, according to disclosed embodiments. As shown in FIG. 9, an expanded time domain signal 910 results from the filtered signal 810 being split into a first signal half 920 and a second signal half 930 by the zero insertion circuit 440, and then having a zero signal portion 940 of zero value placed between the first and second signal halves 920 and 930.

In the disclosed embodiments of FIG. 9, the zero signal portion 940 has the same number of samples as the filtered signal 810 since this embodiment employs 2× interpolation. In one particular embodiment the filtered signal 810 is of length 256. This means that the first and second signal halves 920 and 930 in this embodiment are both 128 samples, and the zero signal portion 940 is 256 samples in length. In general the number of inserted zeros depends on the order of interpolation required, and the length of the estimator DFT 450 depends on the total length output of the zero insertion circuit 440.

In operation, the estimator DFT 450 performs a discrete Fourier transform on the time domain signal 910 to convert the time domain expanded signal 910 from the time domain to frequency domain, thus creating a frequency domain expanded signal 1010. As with the IDFT 420, the DFT 450 can be implemented as a fast Fourier Transform (FFT) using a variety of radix values.

FIG. 10 is as graph of the output signal from the estimator DFT circuit of FIG. 4, according to disclosed embodiments. The frequency domain expanded signal 1010 includes a center portion 1020, a front portion 1030, and an end portion 1040.

In particular, the center portion 1020 provides an estimate of the pilot signal 510, while the front and end portions 1030 and 1040 correspond to the beginning and ending extension signals 620 and 630, respectively. However, because of the increase in the sample size due to interpolation by two times, the output of the estimator DFT 450 is twice the size of the output of the extension circuit 410. In particular, the center portion 1020 is double the length of the pilot signal 510 (i.e., it is 300 samples long rather than 150 samples).

The reduction circuit 460 reduces the size of the frequency domain expanded signal 1010 by eliminating the front and end portions 1030 and 1040, leaving just the center portion 1020 as a channel estimation signal 1110.

Figure 11:
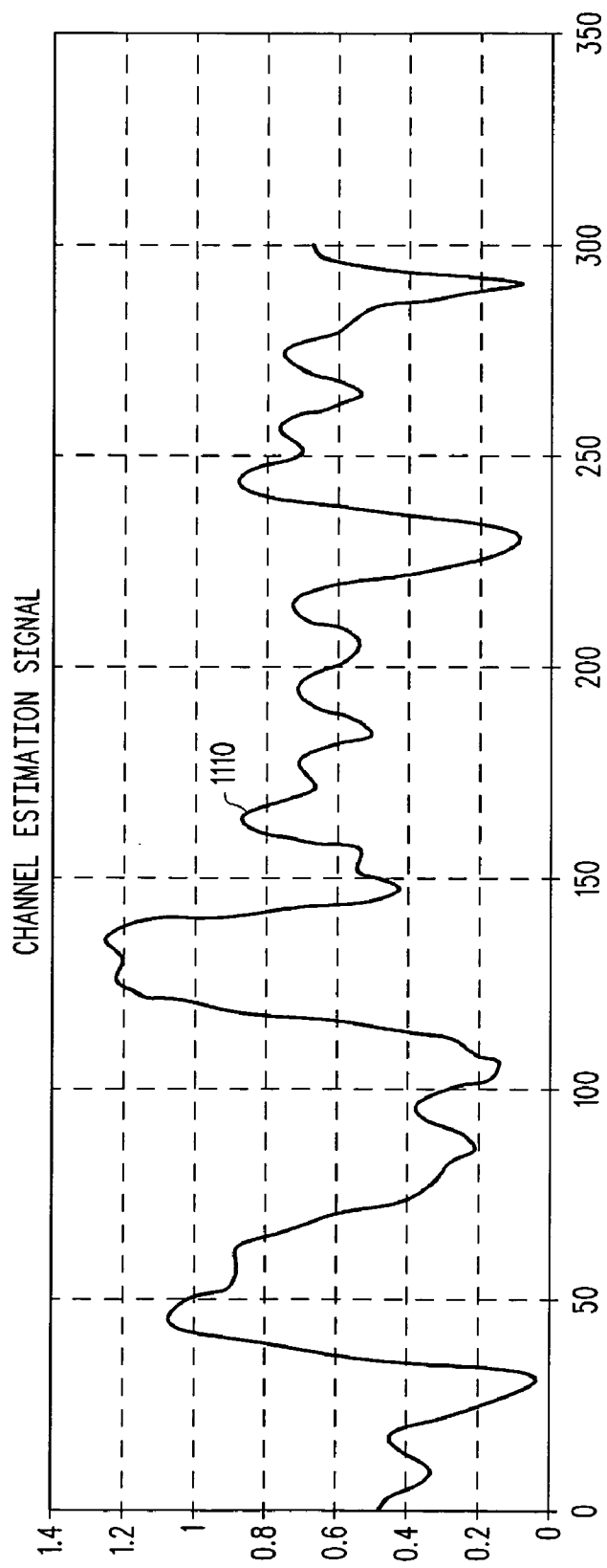
FIG. 11 is as graph of the channel estimation signal of FIG. 4, according to disclosed embodiments.

FIG. 11 is as graph of the channel estimation signal of FIG. 4, according to disclosed embodiments. As shown in FIG. 11, the channel estimation signal 1110 corresponds to the center portion 1020 of FIG. 10.

In general, a channel estimator is provided that includes: an extension circuit configured to receive a pilot signal, to add a front extension signal to a front of the pilot signal, and to add a back extension signal to a back of the pilot signal, to create a first intermediate signal, the front extension signal being an extension of a first symbol in the pilot signal, and the back extension signal being an extension of a last symbol in the pilot signal; an inverse discrete Fourier transform circuit configured to perform an inverse discrete Fourier transform function on the first intermediate signal to generate a second intermediate signal; a signal processing element configured to perform one or more operations on the second intermediate signal to generate a third intermediate signal; a discrete Fourier transform circuit configured to perform a discrete Fourier transform function on the third intermediate signal to generate a fourth intermediate signal; and a reduction circuit configured to truncate a front end of the fourth intermediate signal and a back end of the fourth intermediate signal to generate a channel estimation signal.

The front extension signal, and the back extension signal may each include one or more symbols selected from a constellation of available symbols.

The signal processing element may include a zero insertion circuit configured to split the second intermediate signal in half, and to insert a zeroed signal having an amplitude of approximately zero between the a front half and a back half of the second intermediate signal to create the third intermediate signal. The signal processing element may also include a non-linear filter for performing a filtering operation on the second intermediate signal to generate the third intermediate signal. The signal processing element may also include both a non-linear filter for performing a filtering operation on the second intermediate signal to generate a fifth intermediate signal; and a zero insertion circuit configured to split the fifth intermediate signal in half, and to insert a zeroed signal having an amplitude of approximately zero between the a front half and a back half of the fifth intermediate signal to create the third intermediate signal.

The channel estimator may further include a noise estimator configured to provide an estimation of a noise level in a received signal; and a threshold set circuit configured to provide threshold level to control the operation of the filter based on the estimation of noise level. The threshold level may be between −3 dB and +3 dB around the estimated noise level for the received signal.

The front extension signal may be a first essentially flat linear signal having a first constant value equal to a first value in the pilot signal, and the back extension signal may be a second essentially flat linear signal having a second constant value equal to a last value in the pilot signal. The front extension signal and the back extension signal may be of equal size.

A symbol length of the first intermediate signal may be such that the inverse discrete Fourier transform circuit can be an inverse fast Fourier transform circuit. Likewise, a symbol length of the third intermediate signal may be such that the discrete Fourier transform circuit can be a fast Fourier transform circuit.

The pilot signal may include a plurality of pilot symbols received in a data slot along with a plurality of data symbols, and a frequency of the pilot symbols as compared to a number of total symbols in the data slot may be above or approximately equal to a Nyquist sampling rate.

The channel estimator may be implemented in one of an integrated circuit or software.

Channel Estimation Method

Figure 12:
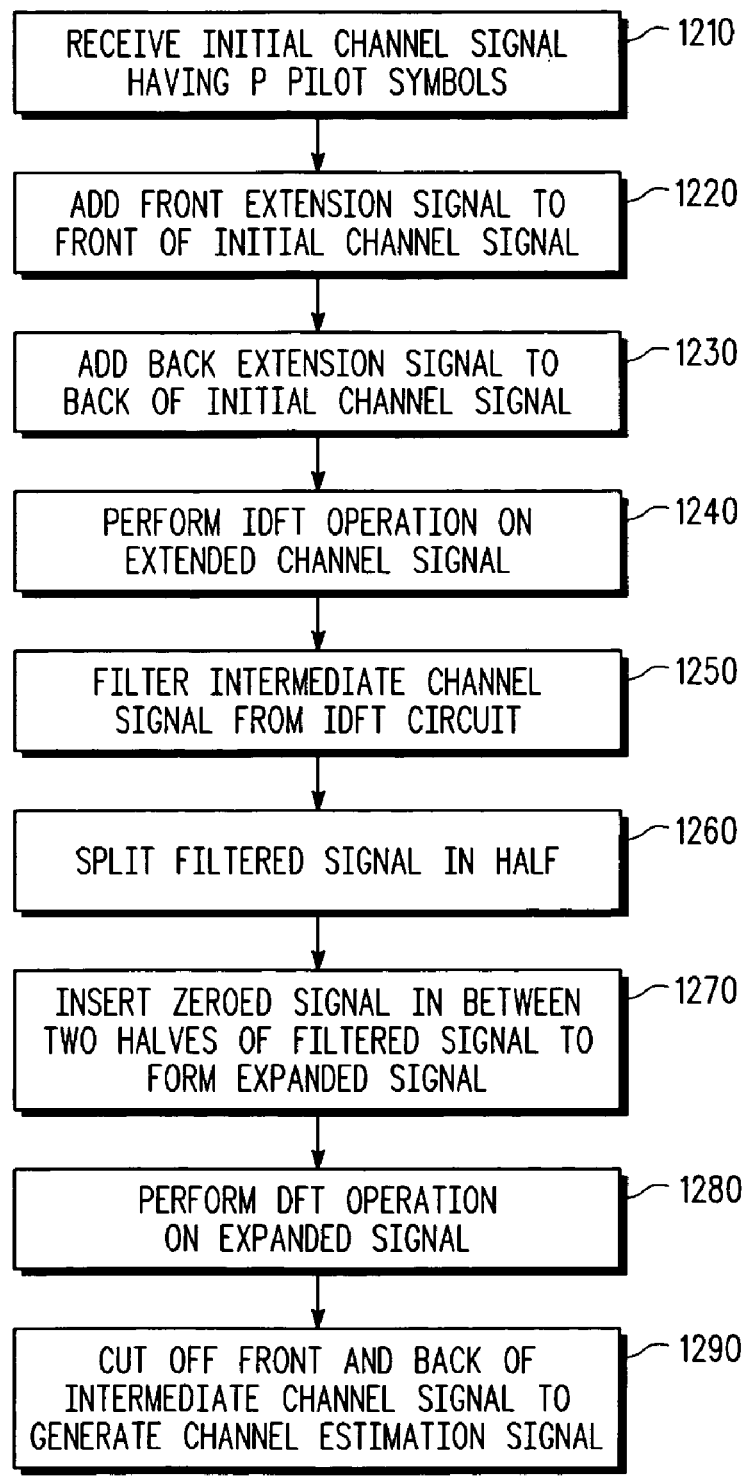
FIG. 12 is a flow chart illustrating the operation of the channel estimation circuit of FIG. 4, according to disclosed embodiments.

FIG. 12 is a flow chart illustrating the operation of the channel estimation circuit of FIG. 4, according to disclosed embodiments.

As shown in FIG. 12, the method begins when the channel estimation circuit 150 receives a pilot signal 510 including P pilot signals. (1210)

The channel estimation circuit 150 then adds a beginning extension signal 620 the front of the pilot signal 510 (1220), and an ending extension signal 630 to the back of the pilot signal 510 (1230). The beginning extension signal 620, pilot signal 510, and ending extension signal 630 together form an extended frequency domain channel signal.

Then the channel estimation circuit 150 performs an IDFT operation on the extended frequency domain channel signal to convert it from the frequency domain to the time domain and generate an extended time domain signal. (1240)

The channel estimation circuit 150 then filters the extended time domain signal according to a set filtering operation to generate a filtered signal (e.g., as described above with respect to the filter 430). (1250)

The channel estimation circuit 150 then splits the filtered in half (1260) and inserts a zeroed signal in between the two halves to form an expanded time domain signal (1270).

Then the channel estimation circuit 150 performs a DFT operation on the expanded time domain signal to convert it from the time domain to the frequency domain and generate an expanded frequency domain signal. (1280)

Finally, the channel estimation circuit 150 cuts off the front and back portions of the expanded frequency domain signal to obtain the channel estimation signal.

In general, a method of estimating a channel response is provided that includes: receiving a pilot signal comprising a series of pilot symbols; adding a front extension signal comprising one or more front symbols to a front of the pilot signal and a back extension signal comprising one or more back symbols to a back of the pilot signal, to create a first intermediate signal; performing an inverse discrete Fourier transform function on the first intermediate signal to generate a second intermediate signal; performing one or more signal processing operations on the second intermediate signal to generate a third intermediate signal; performing a discrete Fourier transform function on the third intermediate signal to generate a fourth third intermediate signal; and cutting off a front end of the fourth third intermediate signal and a back end of the fourth third intermediate signal to generate a channel estimation signal. In this method, the front extension signal is differentiable at all points of interest in the front extension signal and at a transition between the front extension signal and the pilot signal, and the back extension signal is differentiable at all points of interest in the back extension signal and at a transition between the back extension signal and the pilot signal.

The one or more signal processing operations may include splitting the first intermediate channel signal in half to form a first signal half and a second signal half; and inserting a zeroed signal having an amplitude of zero or approximately zero between the first signal half and the second signal half to create the third intermediate signal.

The pilot symbols, the front symbols, and the back symbols may all be selected from a constellation of available symbols, The front extension signal may be a first essentially flat linear signal having a first constant value equal to a first value in the pilot signal, and the back extension signal may be a second essentially flat linear signal having a second constant value equal to a last value in the pilot signal. The front extension signal may also be formed based on a continuous function that is differentiable at all point of interest over the front extension signal, and the back extension signal may be formed based on a continuous function that is differentiable at all point of interest over the back extension signal, A symbol length of the first intermediate signal for one data slot may of length such that the inverse discrete Fourier transform function can be an inverse fast Fourier transform (IFFT) function. Likewise, a symbol length of the third intermediate signal may be of length such that, the discrete Fourier transform function may be a fast Fourier transform (FFT) function.

The front extension signal and the back extension signal may be the same size. A frequency of the pilot symbols in the data slot may be above or approximately equal to a Nyquist sampling rate The method may further include performing a non-linear filtering operation on the first intermediate channel signal before the zero insertion operation in the first intermediate channel signal.

The method may further include determining an estimation of a noise level in a received signal containing the pilot signal; and setting a threshold level to control the operation of the filter based on the estimation of noise level.

The method may be implemented in one of an integrated circuit or software.

More specifically, a method of estimating a channel response is provided that includes: receiving an initial channel signal comprising a series of P pilot symbols; adding a front extension signal comprising a series of F front symbols to a front of the initial channel signal; adding a back extension signal comprising a series of B back symbols to a back of the initial channel signal, to create an extended channel signal; performing an inverse discrete Fourier transform function on the extended channel signal at a sampling length of (P+F+B) to generate a first intermediate channel signal; splitting the first intermediate channel signal in half; inserting a signal having an effective length of Z symbols and an amplitude of zero or approximately zero between the two halves of the first intermediate channel signal to create an expanded channel signal; performing a discrete Fourier transform function on the expanded channel signal at a sampling length of (P+F+B+Z) to generate a second intermediate channel signal; and cutting off a front end of the second intermediate channel signal and a back end of the second intermediate channel signal to generate a channel estimation signal of length D. In this method, B, D, F, P, and Z are all integers, while F and B are both greater than 1. P identifies a number of pilot symbols in one data slot, and D identifies a number of data symbols in one data slot. The P pilot symbols, the F front symbols, and the B back symbols are all selected from a constellation of available symbols. In addition, the F front symbols are selected to be differentiable at all points of interest over the F front symbols and at a transition between the front extension signal and the initial channel signal, and the B back symbols are selected to be differentiable at all points of interest over the B back symbols and at a transition between the back extension signal and the initial channel signal.

In one embodiment, the F front symbols may be selected to be the same as the first pilot symbol in the P pilot, and the B back symbols may be selected to be the same as the last pilot symbol in the P pilot symbols. Alternatively, the F front symbols and the B back symbols may have values based on a continuous function that bridges the first and the last sample of the original data, the continuous function being one that is differentiable at all point of interest. F and B may be equal.

The quantity (P+F+B) may be a power of two or other size which would allow the discrete Fourier transform function to be a fast Fourier transform function. Likewise, the quantity (P+F+B+D) may be a power of two or other size which would allow the inverse discrete Fourier transform function to be an inverse fast Fourier transform function.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A channel estimator, comprising:
   an extension circuit configured to receive a pilot signal, to add a front extension signal to a front of the pilot signal, and to add a back extension signal to a back of the pilot signal, to create a first intermediate signal, the front extension signal being an extension of a first symbol in the pilot signal, and the back extension signal being an extension of a last symbol in the pilot signal;
   an inverse discrete Fourier transform circuit configured to perform an inverse discrete Fourier transform function on the first intermediate signal to generate a second intermediate signal;
   a signal processing element configured to perform one or more operations on the second intermediate signal to generate a third intermediate signal;
   a discrete Fourier transform circuit configured to perform a discrete Fourier transform function on the third intermediate signal to generate a fourth intermediate signal; and
   a reduction circuit configured to truncate a front end of the fourth intermediate signal and a back end of the fourth intermediate signal to generate a channel estimation signal.

2. The channel estimator of claim 1, wherein the signal processing element comprises a zero insertion circuit configured to split the second intermediate signal in half, and to insert a zeroed signal having an amplitude of approximately zero between the a front half and a back half of the second intermediate signal to create the third intermediate signal.

3. The channel estimator of claim 1, wherein the signal processing element comprises a non-linear filter for performing a filtering operation on the second intermediate signal to generate the third intermediate signal.

4. The channel estimator of claim 3, further comprising:
   a noise estimator configured to provide an estimation of a noise level in a received signal; and
   a threshold set circuit configured to provide threshold level to control the operation of the filter based on the estimation of noise level.

5. The channel estimator of claim 1, wherein the signal processing element comprises:
   a filter for performing a filtering operation on the second intermediate signal to generate a fifth intermediate signal;
   a zero insertion circuit configured to split the fifth intermediate signal in half, and to insert a zeroed signal having an amplitude of approximately zero between the a front half and a back half of the fifth intermediate signal to create the third intermediate signal.

6. The channel estimator of claim 5, wherein when the filtering operation comprises:
   setting all points in a front portion of the fifth intermediate signal that are below a noise threshold to a zero or near-zero value,
   setting all points in an end portion of the fifth intermediate signal that are below the noise threshold to a zero or near-zero value, and
   setting all points in a middle portion of the fifth intermediate signal between the front portion and the end portion to a zero or near-zero value.

7. The channel estimator of claim 1, wherein when the front extension signal is concatenated to the end of the back extension signal, a resulting concatenated signal is a continuous differentiable function.

8. The channel estimator of claim 1,
   wherein a symbol length of the first intermediate signal is a power of 2, and
   wherein the inverse discrete Fourier transform circuit is an inverse fast Fourier transform circuit.

9. The channel estimator of claim 1,
   wherein a symbol length of the third intermediate signal is a power of 2, and
   wherein the discrete Fourier transform circuit is a fast Fourier transform circuit.

10. The channel estimator of claim 1, wherein the channel estimator is implemented in one of an integrated circuit or software.

11. A method of estimating a channel response, comprising:
    receiving a pilot signal comprising a series of pilot symbols;
    adding a front extension signal comprising one or more front symbols to a front of the pilot signal and a back extension signal comprising one or more back symbols to a back of the pilot signal at an extension circuit, to create a first intermediate signal;
    performing an inverse discrete Fourier transform function on the first intermediate signal to generate a second intermediate signal;
    performing one or more signal processing operations on the second intermediate signal in a signal processing circuit to generate a third intermediate signal;
    performing a discrete Fourier transform function on the third intermediate signal to generate a fourth third intermediate signal; and
    cutting off a front end of the fourth third intermediate signal and a back end of the fourth third intermediate signal in a reduction circuit to generate a channel estimation signal,
    wherein the front extension signal is differentiable at all points of interest in the front extension signal and at a transition between the front extension signal and the pilot signal, and
    wherein the back extension signal is differentiable at all points of interest in the back extension signal and at a transition between the back extension signal and the pilot signal.

12. The method of claim 11, wherein the performing of one or more signal processing operations comprises:
    splitting the first intermediate channel signal in half to form a first signal half and a second signal half and
    inserting a zeroed signal having an amplitude of zero or approximately zero between the first signal half and the second signal half to create the third intermediate signal.

13. The method of estimating a channel response, as recited in claim 11, further comprising performing a non-linear filtering operation on the first intermediate channel signal before the inserting of a zeroed signal.

14. The method of estimating a channel response, as recited in claim 13, further comprising:
- determining an estimation of a noise level in a received signal containing the pilot signal; and
- setting a threshold level to control the filtering operation based on the estimation of noise level.

15. The method of estimating a channel response, as recited in claim 11,
- wherein the front extension signal is a first essentially flat linear signal having a first constant value equal to a first value in the pilot signal, and
- wherein the back extension signal is a second essentially flat linear signal having a second constant value equal to a last value in the pilot signal.

16. The method of estimating a channel response, as recited in claim 11, wherein when the front extension signal is concatenated to the end of the back extension signal, a resulting concatenated signal is a continuous differentiable function.

17. The method of estimating a channel response, as recited in claim 11, wherein the method is implemented in one of an integrated circuit or software.

18. A method of estimating a channel response, comprising:
- receiving an initial channel signal comprising a series of P pilot symbols;
- adding a front extension signal comprising a series of F front symbols to a front of the initial channel signal;
- adding a back extension signal comprising a series of B back symbols to a back of the initial channel signal, to create an extended channel signal;
- performing an inverse discrete Fourier transform function on the extended channel signal at a sampling length of (P+F+b) to generate a first intermediate channel signal;
- splitting the first intermediate channel signal in half in a zero insertion circuit;
- inserting a signal having an effective length of Z symbols and an amplitude of zero or approximately zero between the two halves of the first intermediate channel signal in the zero insertion circuit to create an expanded channel signal;
- performing a discrete Fourier transform function on the expanded channel signal at a sampling length of (P+F+b+Z) to generate a second intermediate channel signal; and
- cutting off a front end of the second intermediate channel signal and a back end of the second intermediate channel signal in a reduction circuit to generate a channel estimation signal of length D,
- wherein B, D, F, P, and Z are all integers and F and B are both greater than 1,
- wherein P identifies a number of pilot symbols in one data slot, and D identifies a number of data symbols in one data slot,
- wherein the P pilot symbols, the F front symbols, and the B back symbols are all selected from a constellation of available symbols,
- wherein the F front symbols are selected to be differentiable at all points of interest over the F front symbols and at a transition between the front extension signal and the initial channel signal, and
- wherein the B back symbols are selected to be differentiable at all points of interest over the B back symbols and at a transition between the back extension signal and the initial channel signal.

19. The method of estimating a channel response, as recited in claim 18,
- wherein the F front symbols are selected to be the same as the first pilot symbol in the P pilot, and
- wherein the B back symbols are selected to be the same as the last pilot symbol in the P pilot symbols.

20. The method of estimating a channel response, as recited in claim 18,
- wherein the F front symbols and the B back symbols have values based on a continuous function that bridges the first and the last sample of the original data,
- wherein a continuous function is one that is differentiable at all point of interest.

* * * * *

UNITED STATES PATENT AND TRADEMARK OFFICE
CERTIFICATE OF CORRECTION

| | |
|---|---|
| PATENT NO. | : 7,684,504 B2 |
| APPLICATION NO. | : 11/589877 |
| DATED | : March 23, 2010 |
| INVENTOR(S) | : Aziz |

It is certified that error appears in the above-identified patent and that said Letters Patent is hereby corrected as shown below:

IN THE CLAIMS:

Column 14, line 60, in Claim 12, delete "half" and insert -- half; --.

Column 15, line 33, in Claim 18, delete "(P+F+b)" and insert -- (P+F+B) --.

Column 16, lines 2-3, in Claim 18, delete "(P+F+b+Z)" and insert -- (P+F+B+Z) --.

Signed and Sealed this
Fifteenth Day of May, 2012

David J. Kappos
*Director of the United States Patent and Trademark Office*